(12) United States Patent
Galbraith et al.

(10) Patent No.: US 8,664,800 B2
(45) Date of Patent: Mar. 4, 2014

(54) SYSTEM AND METHOD FOR DISTRIBUTION OF INVERTER VAR SUPPORT

(75) Inventors: Anthony William Galbraith, Wirtz, VA (US); Owen Jannis Schelenz, Schenectady, NY (US); Mark Edward Cardinal, Altamont, NY (US); Andreas Kirchner, Osnabrueck (DE); Nicholas Wright Miller, Delmar, NY (US); Kara Clark, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/872,577

(22) Filed: Aug. 31, 2010

(65) Prior Publication Data
US 2012/0049636 A1    Mar. 1, 2012

(51) Int. Cl.
*H02J 1/00*    (2006.01)
*H02M 7/00*    (2006.01)
*F03D 9/00*    (2006.01)

(52) U.S. Cl.
USPC ............... 307/82; 307/151; 290/44; 363/95; 700/298

(58) Field of Classification Search
None
See application file for complete search history.

(56) References Cited

U.S. PATENT DOCUMENTS

| | | | |
|---|---|---|---|
| 6,191,519 B1 * | 2/2001 | Nye et al. | 310/316.01 |
| 6,452,290 B1 * | 9/2002 | Yoshioka et al. | 307/82 |
| 2005/0040655 A1 | 2/2005 | Wilkins et al. | |
| 2009/0200994 A1 | 8/2009 | Fornage | |
| 2010/0025994 A1 | 2/2010 | Cardinal et al. | |
| 2010/0067271 A1 | 3/2010 | Garces et al. | |

FOREIGN PATENT DOCUMENTS

DE    102008034531    *    8/2009    ............... H02P 9/02

* cited by examiner

*Primary Examiner* — Hal Kaplan
(74) *Attorney, Agent, or Firm* — Paul J. DiConza

(57) ABSTRACT

Power inverters are controlled in response to reactive power support commands received from a power grid such that at least one power inverter provides reactive power to the power grid. The reactive power provided is based on each power inverter's reactive power capacity only while the total power capacity of each power inverter providing the reactive power is not exhausted in generating real power.

20 Claims, 2 Drawing Sheets

SYSTEM AND METHOD FOR DISTRIBUTION OF INVERTER VAR SUPPORT

BACKGROUND

Figure 1:
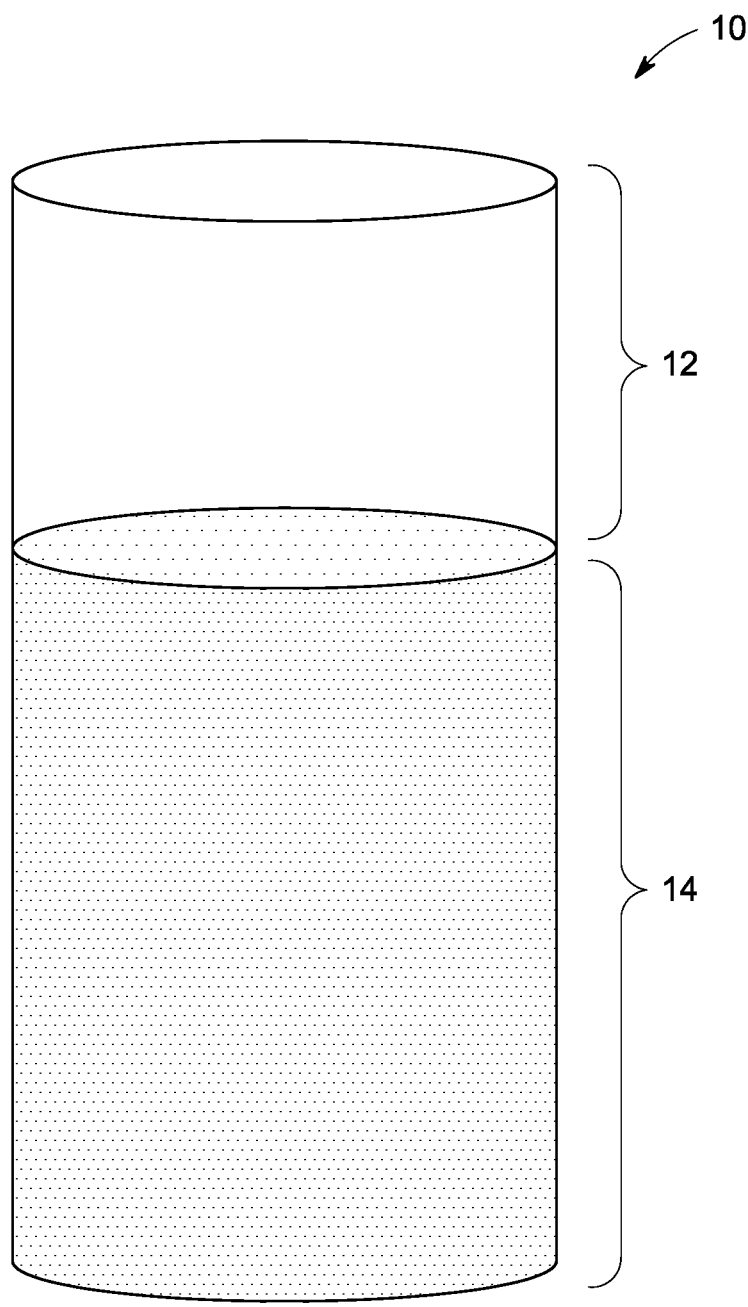

This invention generally relates to renewable energy sources, and more particularly, to systems and methods for controlling power in renewable energy sources.

Solar, wind and hydro power generation systems are generally categorized as renewable variable power generation systems because the energy is harvested from naturally occurring and plentiful sources of energy. However, the amount of power produced by such systems may be unstable. The power generated by a solar farm for example, may vary as a function of cloud coverage and the position of the sun in the sky. Such a solar farm may have a plurality of energy harvesting panels with associated photovoltaic cells and inverters that may require power monitoring and control for coordinating and providing power to an electrical grid. For example, a utility may monitor the grid power demand and may need to communicate with the solar farm to determine if the solar farm has the capacity to meet some or all of the power demand.

It is common to connect many small solar inverters to the electrical grid, making the collection of inverters appear as one power plant. Electrical power grids generally require both a source of active power and a source of reactive power. Active power (Watts) is generally provided to the electrical grid based upon the capacity of each power generation system inverter. Reactive power (VARs) is generally proportioned equally among the inverters based upon the number of inverters in the power generation system. Such proportioned reactive power generation disadvantageously results in a loss of expensive active power from highly productive inverters due to equal sharing.

In view of the foregoing, there is a need for a power inverter system and method of operation that distributes reactive power support from among multiple power inverters, favoring those inverters that have remaining capacity, rather than dividing the total VAR support equally among all the inverters, especially those inverters operating at the maximum rated output power.

BRIEF DESCRIPTION

One embodiment of the present disclosure is directed to a power inverter system, comprising:

one or more power inverters configured to receive power from at least one corresponding energy source; and at least one controller configured to control each power inverter via algorithmic software reactive power support commands such that at least one power inverter provides reactive power to a power grid based on its reactive power capacity and only while its total power capacity is not exhausted in generating real power Another embodiment of the present disclosure is directed to a method of operating a power inverter system, the power inverter system comprising one or more power inverters receiving power from at least one energy source and further comprising at least one power inverter controller, the method comprising:

polling each power inverter to determine its reactive power (VAR) capacity; and controlling each power inverter in response to power inverter controller VAR support commands such that each power inverter having reactive power capacity provides reactive power to a power grid based on its reactive power capacity and only while its total power capacity is not exhausted in generating real power.

DRAWINGS

Figure 2:
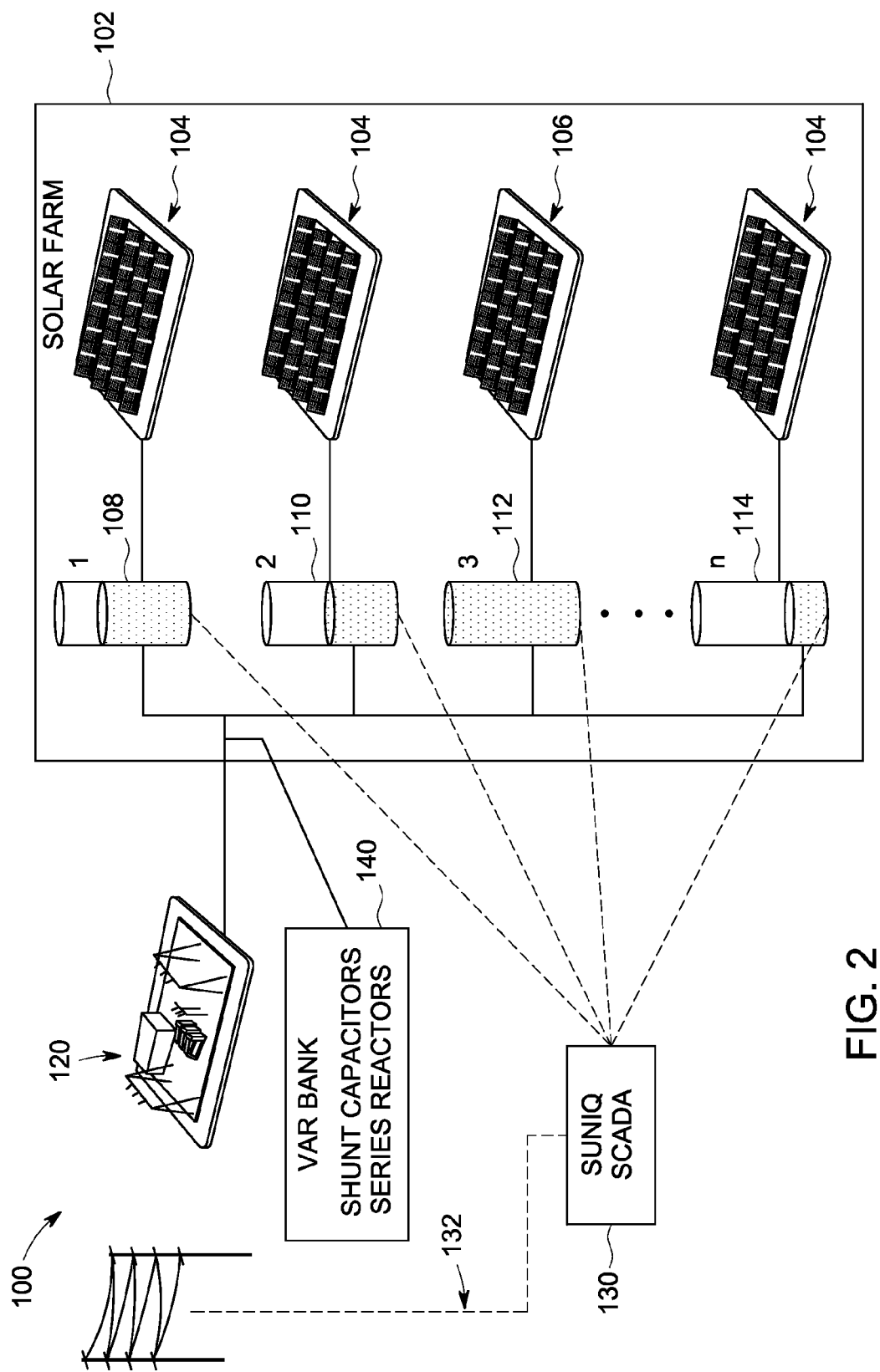

These and other features, aspects, and advantages of the present invention will become better understood when the following detailed description is read with reference to the accompanying drawing, wherein:

FIG. 1 illustrates the capacity of a power inverter to support reactive power and active power according to one embodiment; and FIG. 2 illustrates a solar farm configured to support reactive power and active power according to one embodiment.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

FIG. 1 illustrates the capacity of a power inverter (10) to support reactive power (VARS) and active power (Watts) according to one embodiment. Power inverter 10 may be part of a solar, wind, battery or hydro power generation system. Assuming power inverter 10 provides power to an electrical grid based on solar power, it can be seen that power inverter 10 has a total power capacity that comprises a reactive power capacity 12 and an active power capacity 14. The active power capacity 14 is less than the total power capacity of the inverter 10 since one or more solar panels, described in further detail herein, from which the power inverter 10 draws its power, is generating less than its optimum power due to solar panel damage, inclimate weather, and/or solar panel debris build-up, and so on.

Although the embodied power inverter system 100 is described herein with reference to a solar farm 102, solar power inverters 108, 110, 112, 114 and solar panels 104, other power inverter system embodiments using wind, battery and/or hydro power elements can just as easily be implemented in accordance with the principles described herein. Solar farm 102 for example, may comprise a wind farm, a hydro farm, and/or a battery farm. Solar power inverters 108, 110, 112, 114 may just as easily comprise wind power inverters, battery power inverters, and/or hydro power inverters. Solar panels 104 may just as easily comprise wind turbines, batteries, and/or hydro plants/turbines.

FIG. 2 illustrates power inverter system 100 comprising a solar farm 102 configured to support reactive power and active power according to one embodiment. Solar farm 102 comprises a plurality of solar power inverters 108, 110, 112, 114. Power inverters 108, 110 and 114 are each providing active power to an electrical power grid 120 based upon available power generated via corresponding power sources (solar panels) 104. Solar panels 104 are generating less than optimal solar energy that may be a result of panel damage, inclimate weather, and/or solar panel debris build-up, and so on, as stated herein. Power inverters 108, 110 and 114 therefore are each generating active output power that is less than its respective optimal power generation capacity. Each power inverter thus has reserve capacity to also provide VAR power to the electrical power grid 120.

Power inverter 112 however, is providing its optimal active power to the electrical power grid 120 since its corresponding solar panel 106 is generating its maximum solar energy from which power inverter 112 draws its power. Since the optimal active power of power inverter 112 usurps its entire power generation capacity, power inverter 112 has no power capacity reserve to generate VAR power to the electrical grid 120.

Power inverter system 100 can also be seen to comprise a central controller 130. Controller 130 continuously polls the plurality of power inverters 108, 110, 112, 114 to determine the present real power capacity and present reactive power capacity of each power inverter. Upon receipt of a VAR command via a power grid feedback link 132, the controller 130 proceeds to request VAR support from power inverters 108, 110, 114 with sufficient capacity to support generation of VAR power. Since power inverter 112 is already generating power at its maximum capacity, power inverter 112 is not requested to provide VAR power. VAR power is instead requested only from power inverters 108, 110 and 114. According to one embodiment, VAR power is requested from power inverters 108, 110 and 114 in proportion to the amount of VAR power capacity available from each power inverter. Thus, for example, if power inverter 110 has twice the VAR capacity available as that available from power inverter 108, then power inverter 110 is request to supply twice the VAR power as that requested from power inverter 108. This method of operation ensures that power inverters with higher real power production do not become curtailed due to the assumption that VAR power requests should be shared equally among the plurality of power inverters 108, 110, 112 and 114 operating in response to the central controller 130.

Although power inverter system 100 comprises a central controller 130, other embodiments may comprise a distributed control architecture using the principles described herein. A distributed control architecture may, for example, employ a control structure that is distributed about each inverter such that communications are accomplished via a mesh or neural type network. A distributed control structure provides advantages over a centralized control structure in that failure of a central controller results in overall system failure; whereas failure of a single inverter controller in a distributed control structure does not adversely impact the operation of the inverters still operating under localized control in the distributed control structure.

In summary explanation, a power inverter that operates together with a set of solar panels that have become damaged or covered by debris would have a difficult time extracting rated power from those solar panels, and therefore will have remaining power capacity. Such power inverters would then be favored during a VAR support request. According to one embodiment, a central controller responsive to algorithmic software would be configured to request VAR power in proportion to the VAR power capacity available from each power inverter or in inverse proportion to the real power being generated from each power inverter. A power inverter system configured to operate in response to such VAR requests thus maximizes the respective farm real power output while still supporting VAR requests. According to one aspect, a power inverter is configured to adjust the level at which VAR demand, e.g. from the plant control, takes priority over kW demand. By default, kW will always take priority, and VAR demand will not be fulfilled unless kW available is less than 100%. The level adjustment is implemented according to one embodiment as a power factor at which kW has priority, i.e. if this adjustment were PF=0.9, then kW will take priority until the point at which the VAR demand causes the inverter power factor to fall below 0.9.

According to another embodiment, a plurality of VAR banks 140 that may comprise, for example, a plurality of shunt capacitors and/or a plurality of series reactors are integrated with the solar farm 102 and in electrical communication with one or more power grid 120 substations. Upon receipt of a VAR command via the power grid feedback link 132, the controller 130 proceeds to request VAR support back to the power grid substations for controlling the VAR banks 140 by switching shunt capacitors and series in or out of the system in a fashion familiar to those skilled in the art. Controller then 130 proceeds to request additional VAR support from power inverters 108, 110, 114 with sufficient capacity to further refine the generation of requested VAR power. Fine tuning VAR power in this manner avoids wasted VAR power while more closely meeting the desired VAR requirements. Fine tuning VAR power in this manner further allows the power inverter system 100 to support VAR power requests in the event requested VAR power is deficient solely through use of inverters 108-114, e.g. when all inverters 104, 106 are running at full capacity. VAR power control in the absence of such inverter control techniques is well known in the VAR control system art, and so further details regarding techniques for implementing capacitor and reactor switching to support VAR requests will not be discussed in further detail herein.

According to another embodiment, a central controller 130 or a plurality of distributed inverter controllers are configured to control each power inverter 108-114 such that reactive power is provided during periods of darkness to support sun free reactive power. Each inverter 108-114 thus comprises a dedicated inverter controller that may operate in combination with or independently of a central controller 130. Providing sun free reactive power according to one aspect is implemented by ensuring an inverter is fully loaded prior to requesting sun free reactive power from another inverter having VAR capacity. This technique promotes increased inverter efficiencies since the inverters 108-114 are generally designed to function at or near a designed operating point.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power inverter system, comprising:
   one or more power inverters configured to receive power from at least one corresponding energy source; and
   at least one controller configured to control each power inverter via algorithmic software reactive power support commands such that at least one power inverter provides reactive power to a power grid based on its reactive power capacity and only while its total power capacity is not exhausted in generating real power.

2. The power inverter system according to claim 1, further comprising one or more power converters selected from solar panels, wind turbines, batteries and hydro power generators, wherein the relative proportion of reactive power capacity for each power inverter is based on the real power generated via one or more corresponding power converters.

3. The power inverter system according to claim 1, wherein at least one controller is further configured to generate the reactive power support commands in response to feedback information received from the power grid.

4. The power inverter system according to claim 1, wherein at least one controller is further configured to control each power inverter such that reactive power is provided only by power inverters that are not operating at substantially maximum planned real power capacity.

5. The power inverter system according to claim 1, wherein at least one controller is further configured to control each power inverter such that reactive power is provided only by power inverters that are not fully loaded.

6. The power inverter system according to claim 1, wherein at least controller is further configured to control each power inverter such that each inverter operates at substantially its present maximum real power generation level prior to commencing its operation to provide additional reactive power support.

7. The power inverter system according to claim 1, wherein at least one inverter providing reactive power is operating in a curtailed mode preventing its operation at a corresponding maximum power point.

8. The power inverter system according to claim 1, further comprising at least one reactive power (VAR) bank, wherein at least one controller is further configured to control the at least one VAR bank and the one or more power inverters having reactive power capacity such that the one or more power inverters operate to incrementally supply reactive power to the power grid in smaller increments than that capable of being supplied via the at least one VAR bank.

9. The power inverter system according to claim 8, wherein each VAR bank comprises components selected from shunt capacitors and series reactors.

10. The power inverter system according to claim 1, further comprising at least one reactive power (VAR) bank, wherein at least one controller is further configured to control the at least one VAR bank and the one or more power inverters such that the bulk of reactive power to the grid is first supplied via the at least one VAR bank and further such that additional reactive power to the grid is supplied via the one or more power inverters to dynamically adjust the total reactive grid power to a desired VAR regulation value.

11. The power inverter system according to claim 1, wherein at least one inverter is configured to adjust the level at which reactive power demand via a corresponding controller takes precedence over real power demand.

12. A method of operating a power inverter system comprising one or more power inverters receiving power from at least one energy source and further comprising at least one power inverter controller, the method comprising:
  polling each power inverter to determine its reactive power (VAR) capacity; and
  controlling each power inverter in response to power inverter controller VAR support commands such that each power inverter having reactive power capacity provides reactive power to a power grid based on its reactive power capacity and only while its total power capacity is not exhausted in generating real power.

13. The method according to claim 12, wherein the controller VAR support commands are based upon feedback information received from the power grid.

14. The method according to claim 12, further comprising controlling each power inverter such that each inverter operates at substantially its present maximum operating real power generation level prior to commencing its operation to provide additional reactive power support.

15. The method according to claim 12, further comprising controlling at least one power inverter having reactive power capacity such that it operates in a curtailed mode preventing its operation at a corresponding maximum power point.

16. The method according to claim 12, further comprising:
  providing at least one reactive power (VAR) bank configured to provide reactive power to the power grid; and
  controlling the at least one VAR bank and the one or more power inverters having reactive power capacity such that the one or more power inverters operate to incrementally supply reactive power to the power grid in smaller increments than that capable of being supplied via the at least one VAR bank.

17. The method according to claim 16, wherein each VAR bank comprises components selected from shunt capacitors and series reactors.

18. The method according to claim 12, further comprising:
  providing at least one reactive power (VAR) bank configured to provide reactive power to the power grid; and
  controlling the at least one VAR bank and the one or more power inverters having reactive power capacity such that the bulk of reactive power to the grid is first supplied via the at least one VAR bank and further such that additional reactive power to the grid is supplied via the one or more power inverters to dynamically adjust the total reactive grid power to a desired VAR regulation value.

19. The method according to claim 12, further comprising:
  providing at least one power converter selected from solar panels, wind turbines, batteries, and hydro power generators; and
  configuring the at least one power converter such that the relative proportion of reactive power capacity for each power inverter is based on the energy generated via one or more corresponding power converters.

20. The method according to claim 12, further comprising controlling the level at which reactive power demand takes precedence over real power demand for at least one power inverter.

* * * * *